US012446998B2

(12) United States Patent
Kim

(10) Patent No.: US 12,446,998 B2
(45) Date of Patent: Oct. 21, 2025

(54) METHOD OF PREVENTING SUCKBACK OF DENTAL HANDPIECE BY BYPASS INJECTION OF DRIVING AIR AND DENTAL HANDPIECE SYSTEM HAVING BYPASS INJECTION STRUCTURE

(71) Applicant: DUNAMIS DENTAL CO., LTD., Gwangmyeong-si (KR)

(72) Inventor: Yangsoo Kim, Seoul (KR)

(73) Assignee: DUNAMIS DENTAL CO., LTD., Gwangmyeong-si (KR)

( * ) Notice: Subject to any disclaimer, the term of this patent is extended or adjusted under 35 U.S.C. 154(b) by 375 days.

(21) Appl. No.: 17/924,035

(22) PCT Filed: Mar. 26, 2021

(86) PCT No.: PCT/KR2021/003760
§ 371 (c)(1),
(2) Date: Nov. 8, 2022

(87) PCT Pub. No.: WO2022/203100
PCT Pub. Date: Sep. 29, 2022

(65) Prior Publication Data
US 2023/0172699 A1 Jun. 8, 2023

(51) Int. Cl.
*A61C 17/022* (2006.01)
(52) U.S. Cl.
CPC .................. *A61C 17/022* (2013.01)
(58) Field of Classification Search
CPC ....... A61C 1/00007; A61C 1/05; A61C 1/052; A61C 1/057; A61C 1/0038; A61C 1/0061;
(Continued)

(56) References Cited

U.S. PATENT DOCUMENTS 3,052,984 A * 9/1962 Mitthauer ............... F01D 15/06
433/106
3,175,293 A * 3/1965 Borden .................... A61C 1/05
415/92
(Continued)

FOREIGN PATENT DOCUMENTS

EP    0867152 A2 *  9/1998  ............. A61C 1/057
EP    2606846 A1 *  6/2013  ............. A61C 1/057
(Continued)

OTHER PUBLICATIONS

International Search Report for PCT/KR2021/003760 mailed Dec. 27, 2021 from Korean Intellectual Property Office.
(Continued)

*Primary Examiner* — Thomas C Barrett
*Assistant Examiner* — Shannel Nicole Belk
(74) *Attorney, Agent, or Firm* — Paratus Law Group, PLLC

(57) ABSTRACT

A method of preventing suckback of a dental handpiece and a dental handpiece system having a bypass injection structure are capable of effectively blocking a suckback phenomenon that occurs at the moment a rotating impeller stops. The method of preventing suckback includes bypassing air pumped from an air pump in a state where a flow path of an air supply pipe is blocked at the moment the impeller stops rotating and halts inside a head casing and injecting the air into the head casing through an air discharge pipe to block the suckback phenomenon.

1 Claim, 8 Drawing Sheets

(58) Field of Classification Search
CPC ... A61C 17/0022; A61C 17/125; F01B 25/02; F10D 15/06; Y10S 415/904
See application file for complete search history.

(56) References Cited

U.S. PATENT DOCUMENTS

| | | | | |
|---|---|---|---|---|
| 3,865,505 | A * | 2/1975 | Flatland | F01D 15/062 415/149.1 |
| 3,946,490 | A * | 3/1976 | Sotman | A61C 1/05 433/104 |
| 5,286,194 | A * | 2/1994 | Horiuchi | A61C 1/05 433/132 |
| 5,308,242 | A * | 5/1994 | McLaughlin | A61C 1/052 433/114 |
| 5,340,312 | A * | 8/1994 | Murase | A61C 1/052 433/132 |
| 5,567,154 | A * | 10/1996 | Wohlgemuth | A61C 1/05 433/132 |
| 5,782,634 | A * | 7/1998 | Lingenhole | A61C 1/057 433/132 |
| 5,800,170 | A * | 9/1998 | Tsukada | A61C 1/057 433/98 |
| 2016/0000521 | A1 * | 1/2016 | Ertugrul | A61C 1/052 433/132 |
| 2017/0340412 | A1 * | 11/2017 | Zhang | A61C 1/12 |
| 2023/0172699 | A1 * | 6/2023 | Kim | A61C 1/052 433/80 |

FOREIGN PATENT DOCUMENTS

| | | | |
|---|---|---|---|
| JP | 2019-171320 A | | 10/2019 |
| KR | 20-1997-0000407 U | | 1/1997 |
| KR | 10-0971889 B1 | | 7/2010 |
| KR | 20120117339 A | * | 10/2012 |
| KR | 10-2249364 B1 | | 5/2021 |

OTHER PUBLICATIONS

Ying-Jun Quan et al., "A testing methodology for suck-back behavior of high-speed air-turbine dental handpiece", Journal of the Korean Society of Dental Materials, Mar. 16, 2015, pp. 29-33, vol. 42, No. 1.

* cited by examiner

# METHOD OF PREVENTING SUCKBACK OF DENTAL HANDPIECE BY BYPASS INJECTION OF DRIVING AIR AND DENTAL HANDPIECE SYSTEM HAVING BYPASS INJECTION STRUCTURE

CROSS-REFERENCE TO PRIOR APPLICATION

This Application is a National Stage Application of PCT/KR2021/003760 filed on Mar. 26, 2021, which is hereby incorporated by reference in its entirety.

BACKGROUND

The present disclosure relates to a dental handpiece, and more particularly, to a method of preventing suckback of a dental handpiece to effectively block a suckback phenomenon that occurs at the moment when a rotating impeller stops and a dental handpiece system having a bypass injection structure.

In general, a dental handpiece used in medical procedures such as dentistry is a device for cleaning a necessary part by injecting pressure water or driving air, is configured in various shapes for each use, and is connected with an air tube or a coolant tube through connection hoses.

However, in this handpiece, an impeller maintains rotation by inertia even after stopping supply of the driving air. At this time, since the supply of the driving air is stopped, the driving air that rotates with the impeller is sent to an air discharge hose. Accordingly, some or all of its head is in a vacuum state. As a result, foreign substances attached to or in the vicinity of a tool such as a burr, for example, cuttings such as saliva, blood, and teeth of a patient, are sucked into the head through a gap in the head and are often accumulated. This causes a fatal problem of cross-infection with other patients.

FIG. 1 is a reference view for explaining a dental handpiece having a function to prevent suckback according to a related art.

As shown, the dental handpiece according to the related art is is configured to include a head 11, an impeller 12 rotatably accommodated in a chamber 11a formed inside the head 11 to provide a rotational force to a mechanism such as a burr 13, an air supply port 61 for supplying driving air toward the impeller 12 and an air discharge port 62 for discharging the driving air supplied to the impeller 12 to the outside, and a cooling water supply port 63 and a cooling water injection port 64 for supplying air to inject cooling water to the outside.

In the handpiece according to the related art configured as described above, at the moment of stopping operation when the supply of the driving air to the chamber 11a inside the head 11 is stopped, some of the driving air supplied to the chamber 11a escapes through the air supply port 61 and the air discharge port 62 due to rotational inertia of the impeller 12. For this reason, while negative pressure or vacuum pressure is applied to the chamber 11a, cuttings such as saliva, blood, and teeth of the patient are sucked into the head 11 through the gap in the head 11 and accumulated, and then cross-infection with other patients occurs.

SUMMARY

Accordingly, the present disclosure has been proposed to solve the problems of the related art as described above, and an object of the present disclosure is to provide a method of preventing suckback of a dental handpiece that is capable of effectively block the suckback phenomenon occurring when the rotating impeller stops and a dental handpiece system having a bypass injection structure.

In order to achieve the above object, a method of preventing suckback of a dental handpiece according to a technical idea of the present disclosure is characterized in its technical configuration by bypassing air pumped from an air pump in a state where a flow path of an air supply pipe is blocked at the moment an impeller stops rotating and halts inside a head casing and injecting the air into the head casing through an air discharge pipe to block the suckback phenomenon.

Here, the method may be characterized by installing and using, in order to bypass the air pumped from the air pump, a bypass pipe connecting the air supply pipe connected to supply the driving air pumped from the air pump to the inside of the head casing and the air discharge pipe connected to the head casing to discharge the air supplied to the inside of the head casing to the outside, and blocking an outlet side flow path of the air discharge pipe together with the flow path of the air supply pipe at the moment the impeller stops rotating and halts.

In addition, a dental handpiece system for blocking the suckback phenomenon according to the method of preventing suckback of the dental handpiece is characterized in its technical configuration by including the air supply pipe connected to the head casing to supply the driving air pumped from the air pump to the inside of the head casing to rotate the impeller installed inside the head casing of the handpiece, and the air discharge pipe connected to the head casing to discharge the air supplied to the inside of the head casing to the outside, and further including a bypass pipe for connecting the air supply pipe and the air discharge pipe while bypassing the head casing to guide the air pumped from the air pump to bypass and then to be injected into the head casing through the air discharge pipe at the moment the impeller stops rotating and halts.

Here, the dental handpiece system may be characterized in that a first solenoid valve is installed in the air supply pipe, a second solenoid valve is installed in the air discharge pipe, and a third solenoid valve is installed in the bypass pipe, respectively, the first solenoid valve is installed upstream of a connection point of the bypass pipe in the air supply pipe, and the second solenoid valve is installed downstream of a connection point of the bypass pipe in the air discharge pipe, and at the moment the impeller stops rotating and halts, the first solenoid valve and the second solenoid valve are in closed states to block flow paths, and the third solenoid valve is in an open state such that the air pumped from the air pump is guided to be bypassed and then to be injected into the head casing through the air discharge pipe.

In addition, the dental handpiece system may be characterized in that a first nozzle and a second nozzle that are independent from each other are separately formed as a nozzle for injecting the driving air supplied from the air pump toward blades of the impeller in the head casing, and the first nozzle and the second nozzle simultaneously inject air to adjacent blades while the air is supplied from the air pump through flow paths independent from each other, respectively, to increase a rotational force of the impeller.

In addition, the dental handpiece system may be characterized in that the air supply pipe is provided with a first air supply pipe and a second air supply pipe which are respectively connected to the first nozzle and the second nozzle of the head casing and independently supply the driving air from the air pump, the air discharge pipe is provided with a first air discharge pipe connected to a first discharge port mainly responsible for discharging the air injected into the head casing from the first nozzle, and a second air discharge pipe connected to a second discharge port mainly responsible for discharging the air injected into the head casing from the first nozzle separately from the first air discharge pipe, the bypass pipe is provided with a first bypass pipe connecting the first air supply pipe and the first air discharge pipe while bypassing the head casing to guide the air pumped from the air pump to be injected into the head casing through the first air discharge pipe instead of the first air supply pipe at the moment the impeller stops rotating and halts, and a second bypass pipe connecting the first air supply pipe and the second air discharge pipe while bypassing the head casing to guide the air pumped from the air pump to be injected into the head casing through the second air discharge pipe instead of the second air supply pipe at the moment the impeller halts, a first solenoid valve is installed in the first air supply pipe, a second solenoid valve is installed in the first air discharge pipe, a third solenoid valve is installed in the first bypass pipe, a fourth solenoid valve is installed in the second air supply pipe, a fifth solenoid valve is installed in the second air discharge pipe, and a sixth solenoid valve is installed in the second bypass pipe, respectively, the first solenoid valve is installed upstream of a connection point of the first bypass pipe in the first air supply pipe, the second solenoid valve is installed downstream of a connection point of the first bypass pipe in the first air discharge pipe, the fourth solenoid valve is installed upstream of a connection point of the second bypass pipe in the second air supply pipe, and the fifth solenoid valve is installed downstream of a connection point of the second bypass pipe in the second air discharge pipe, and at the moment the impeller stops rotating and halts, the first solenoid valve, the second solenoid valve, the fourth solenoid valve, and the fifth solenoid valve are in closed states to block flow paths, and the third solenoid valve and the sixth solenoid valve are in open states to guide the air pumped by the air pump to be injected into the head casing through the first air discharge pipe and the second air discharge pipe, thereby, making it possible to reliably prevent the suckback phenomenon.

A dental handpiece system according to the present disclosure uses a bypass pipe to bypass driving air of an air pump at the moment when an impeller stops rotating and halts so that air is injected from a discharge port, thereby almost completely blocking the suckback phenomenon which has been a chronic problem.

In addition, according to the present disclosure, it is possible to greatly improve the rotational force of the impeller by a dual structure having two nozzles for being supplied with the driving air through independent flow paths and then simultaneously injecting the driving air to a plurality of blades, thereby enabling downsizing of the product.

<Explanation of Symbols>

Figure 1:
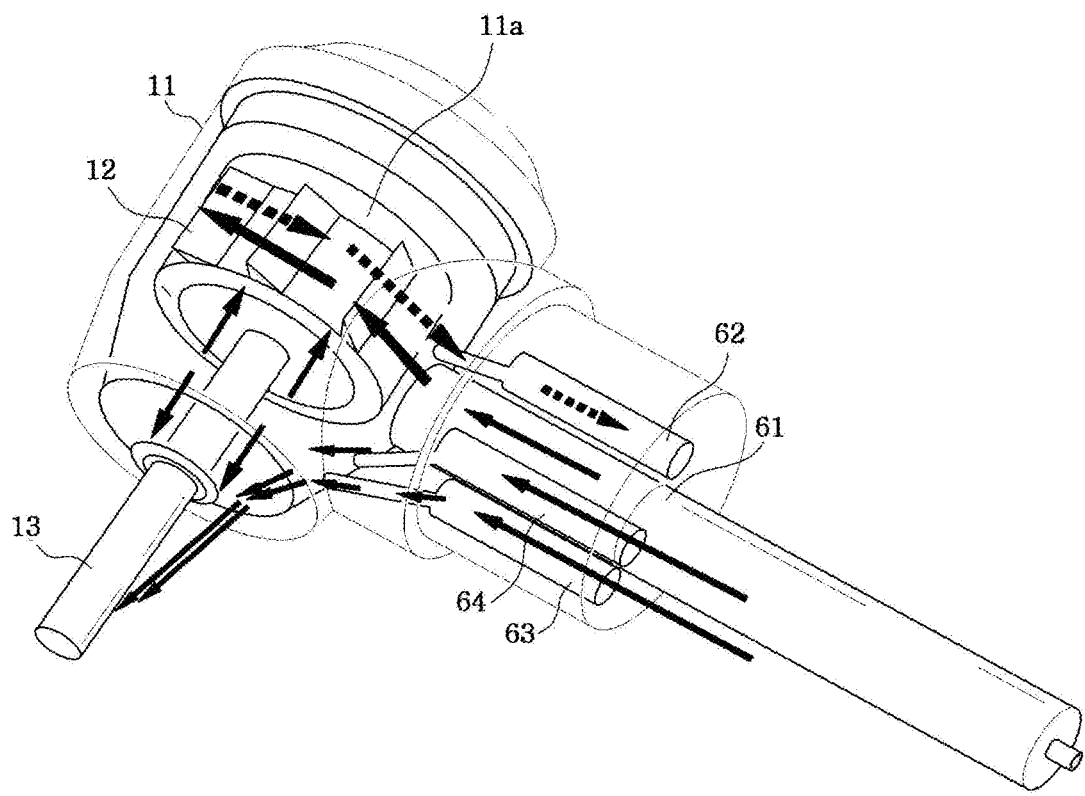
FIG. 1 is a reference view for explaining a configuration of a dental handpiece according to a related art.

110: Head casing
110a: Chamber
111a: First supply port
111b: Second supply port
112a: First discharge port
112b: Second discharge port
113: Cooling water supply port
114: Air supply port for cooling water
115a: First nozzle
115b: Second nozzle
120: Impeller
121: Blade
130: Burr
141: Air supply pipe
142: Air discharge pipe
143: Bypass pipe
151: First solenoid valve
152: Second solenoid valve
153: Third solenoid valve

DETAILED DESCRIPTION

A dental handpiece system according to embodiments of the present disclosure will be described in detail with reference to the accompanying drawings. Since the present disclosure may have various changes and have various forms, specific embodiments are illustrated in the drawings and described in detail in the following. However, it should be understood that the embodiments are not intended to limit the present disclosure to a specific disclosed form and include all modifications, equivalents, and replacements within the idea and technical scope of the present disclosure. In describing each drawing, like reference numerals have been used for like components. In the accompanying drawings, the dimensions of the structures are enlarged than the actual for clarity of the present disclosure, or shown reduced than the actual in order to understand the schematic configuration.

Also, terms such as "first" and "second" may be used to explain various components, but the components should not be limited by the terms. The above terms are used only for the purpose of distinguishing one component from another. For example, a first component may be referred to as a second component, or similarly, the second component may also be referred to as the first component without departing from the scope of the present disclosure. Unless otherwise defined herein, all terms used herein including technical or scientific terms have the same meanings as those generally understood by one of ordinary skill in the art. Terms defined in dictionaries generally used should be construed to have meanings matching contextual meanings in the related art and are not to be construed as an ideal or excessively formal meaning unless otherwise defined herein.

EMBODIMENTS

Figure 2:
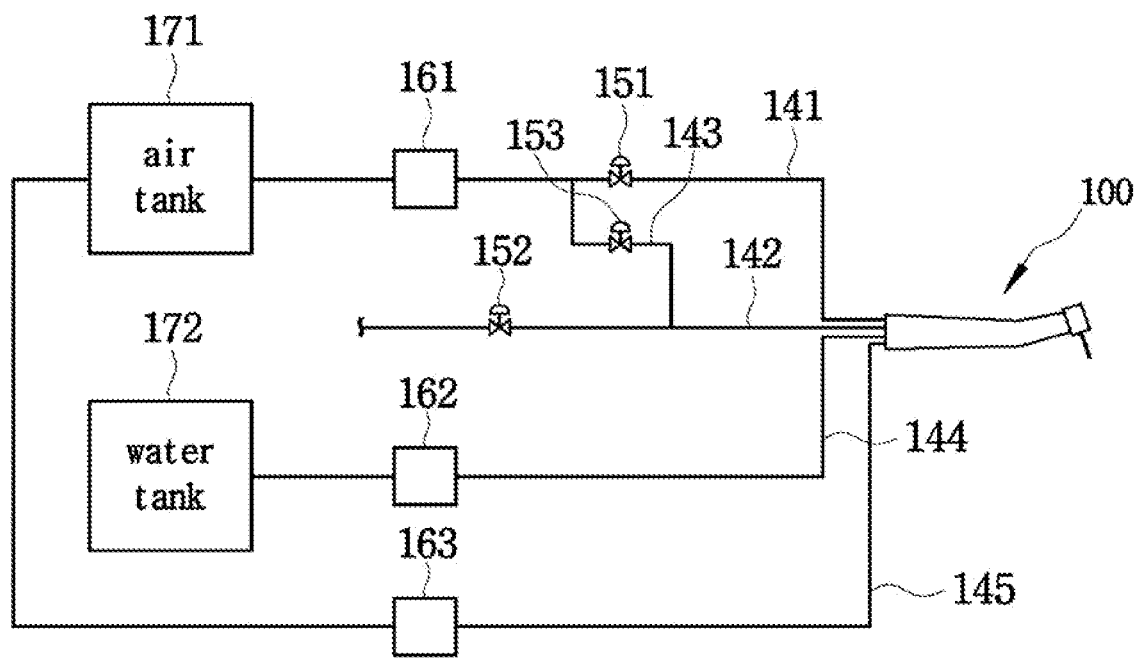
FIG. 2 is an overall configuration diagram of a dental handpiece system according to an embodiment of the present disclosure.
Figure 3:
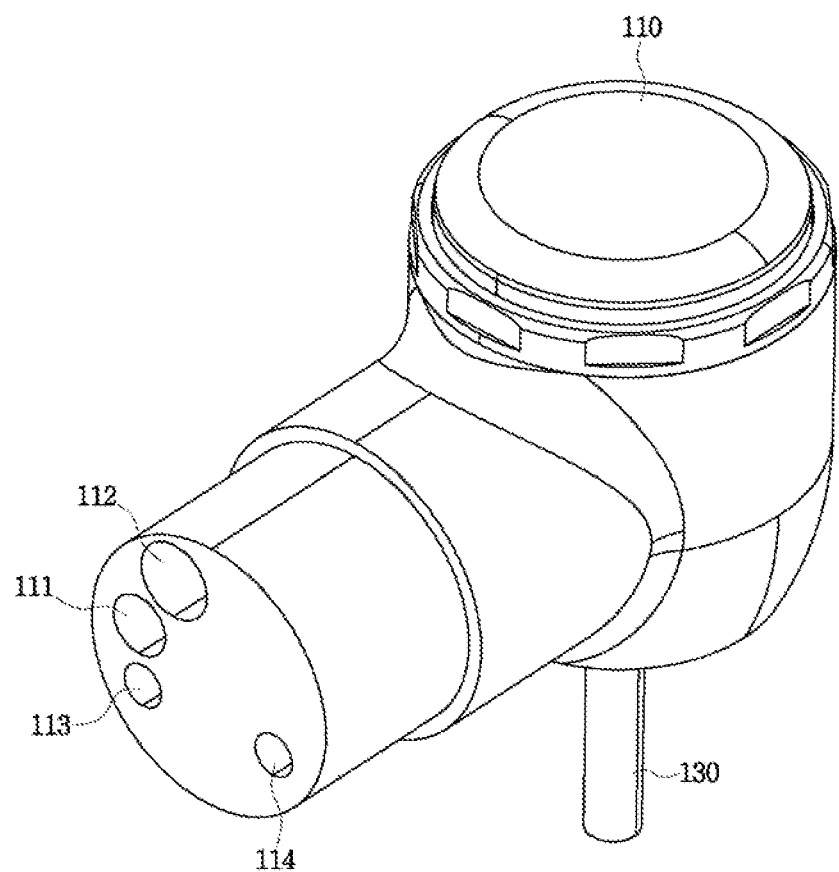
FIG. 3 is a rear perspective view of a handpiece in a dental handpiece system according to an embodiment of the present disclosure.
Figure 4:
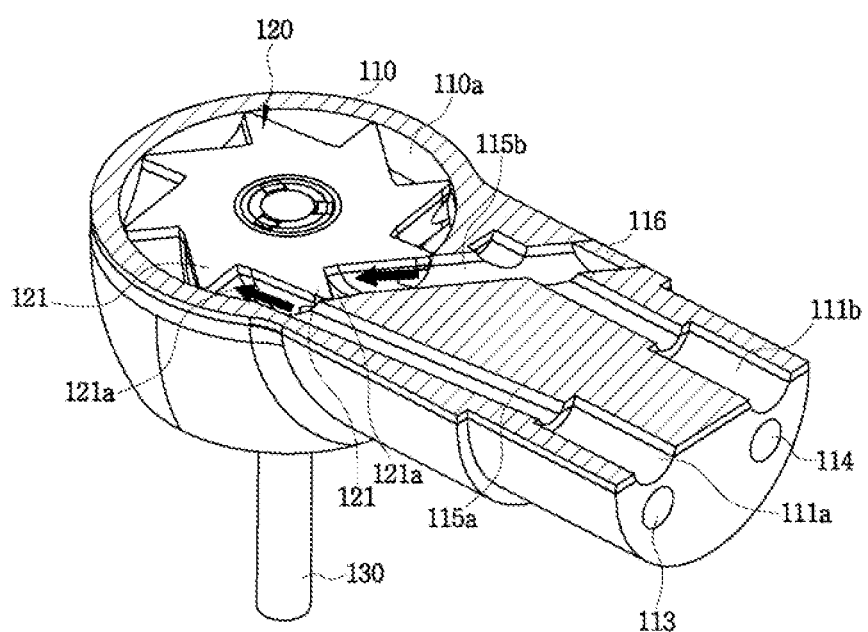
FIG. 4 is a perspective view of a partially cut-out state to explain a configuration of a handpiece in a dental handpiece system according to an embodiment of the present disclosure.

FIG. 2 is an overall configuration diagram of a dental handpiece system according to an embodiment of the present disclosure, FIG. 3 is a rear perspective view of a handpiece in the dental handpiece system according to an embodiment of the present disclosure, and FIG. 4 is a perspective view of a partially cut-out state to explain a configuration of the handpiece in the dental handpiece system according to an embodiment of the present disclosure.

As shown, a dental handpiece system according to an embodiment of the present disclosure is configured to almost completely block the suckback phenomenon, which has been a chronic problem, by bypassing driving air of an air pump 161 using a bypass pipe 143 at the moment an impeller 120 stops rotating and halts to allow air to be injected from a side of a discharge port.

To this end, the present disclosure includes an air supply pipe 141 connected to a head casing 110 to supply the driving air pumped from the air pump 161 to an inside of the head casing 110 to rotate the impeller 120 installed inside the head casing of a handpiece 100 and an air discharge pipe 142 connected to the head casing 110 to discharge air supplied to the inside of the head casing 110 to the outside, and further includes the bypass pipe 143 connecting the air supply pipe 141 and the air discharge pipe 142 while bypassing the head casing 110.

As a result, at the moment the impeller 120 stops rotating and halts, the driving air pumped from the air pump 161 may be bypassed and then guided to be injected into the head casing 110 through the air discharge pipe 142. As such, when the air can be injected into the head casing 110 through the air discharge pipe 142 at the moment the impeller 120 halts, a part of the driving air supplied to a chamber 110a of the head casing 110 escapes through an air supply port 111 and an air discharge port 112 due to rotational inertia of the impeller 120, and accordingly it becomes possible to completely block the suckback phenomenon where negative pressure or vacuum pressure is applied to the chamber.

Here, a first solenoid valve 151 is installed in the air supply pipe 141, a second solenoid valve 152 is installed in the air discharge pipe 142, and a third solenoid valve 153 is installed in the bypass pipe 143, respectively. It is important that the first solenoid valve 151 is installed upstream of a connection point of the bypass pipe 143 in the air supply pipe 141, and the second solenoid valve 152 is installed downstream of a connection point of the bypass pipe 143 in the air discharge pipe 142. Accordingly, at the moment the impeller 120 stops rotating and halts, the first solenoid valve 151 and the second solenoid valve 152 are in closed states to block flow paths, the third solenoid valve 153 is in an open state, and the air pumped from the air pump 161 may be guided to be bypassed through the bypass pipe 143 and then to be injected into the head casing 110 through the air discharge pipe 142.

Table 1 below summarizes the open and closed states of the solenoid valves according to driving states of the impeller 120 of the handpiece. In particular, the open or closed state of each solenoid valve for preventing the suckback phenomenon at the moment the impeller 120 halts should be noted.

TABLE 1

| Operation order | Driving state | First solenoid valve 151 | Second solenoid valve 152 | Third solenoid valve 153 |
| --- | --- | --- | --- | --- |
| Stage 1 | Ready to drive | X | O | X |
| Stage 2 | Running | O | O | X |
| Stage 3 | Moment of halt | X | X | O |
| Stage 4 | End of drive | X | O | X |

In the meantime, many efforts have been made, such as changing an internal structure of the handpiece, to solve the problems caused by the suckback, but to no avail. The present disclosure can solve the chronic suckback problem through a simple structural change of installing the bypass pipe 143 and an additional solenoid valve as described above. For reference, a cooling water supply pipe 144 is supplied with cooling water from a cooling water tank 172, and a water pump 162 is installed therebetween to pump the cooling water. In addition, an air supply pipe 145 for the cooling water is also connected to be supplied with air from an air tank 171, and a separate air pump 163 is installed therebetween to pump air.

MODES FOR CARRYING OUT THE INVENTION

On the other hand, in a dental handpiece system according to a modified embodiment of the present disclosure, a handpiece may significantly improve rotational force of an impeller by a dual structure having two nozzles for being supplied with driving air through independent flow paths and then simultaneously injecting the driving air to a plurality of blades and thus is configured to enable downsizing of the product. This will be described below.

Figure 5:
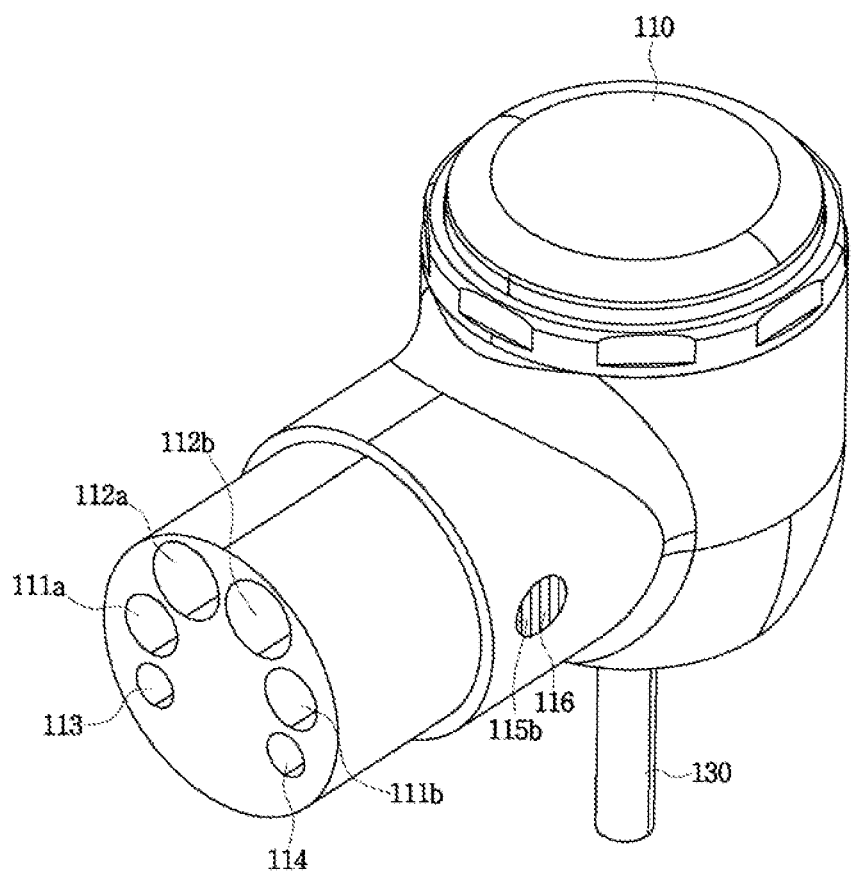
FIG. 5 is a rear perspective view of a handpiece in a dental handpiece system according to a modified embodiment of the present disclosure.
Figure 6:
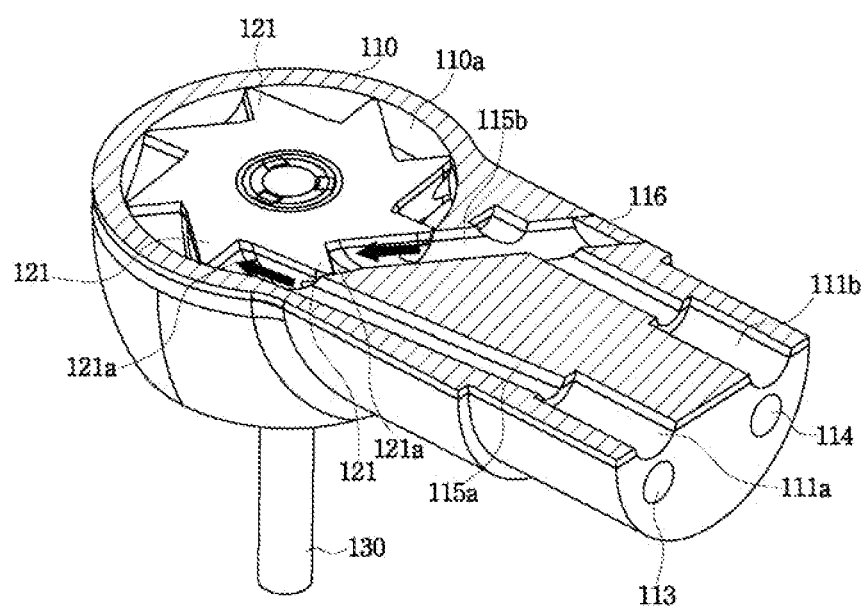
FIG. 6 is a perspective view of a partially cut-out state to explain a configuration of a handpiece in a dental handpiece system according to a modified embodiment of the present disclosure.
Figure 7:
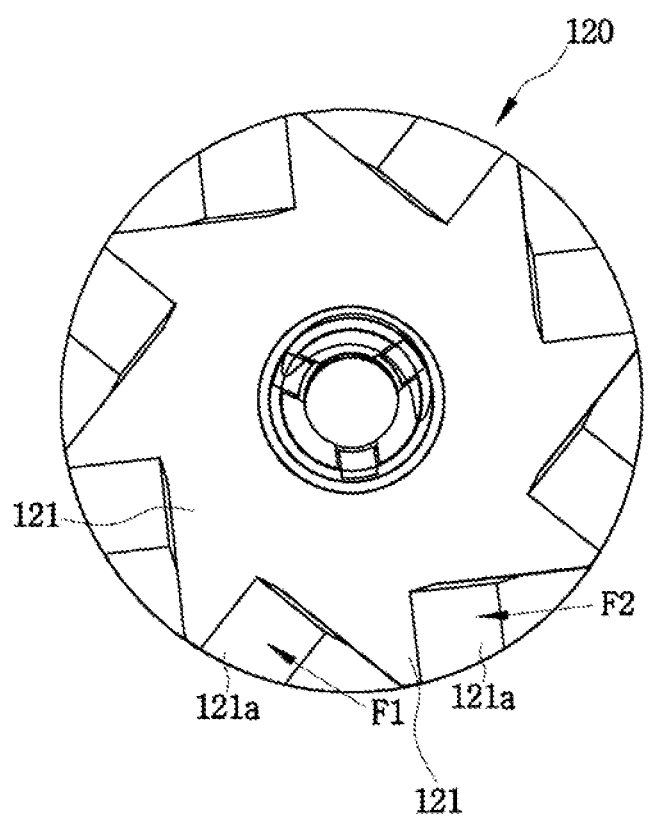
FIG. 7 is a plan view of an impeller in a handpiece in a dental handpiece system according to a modified embodiment of the present disclosure.

FIG. 5 is a rear perspective view of a handpiece in a dental handpiece system according to a modified embodiment of the present disclosure, FIG. 6 is a perspective view of a partially cut-out state to explain a configuration of a handpiece in a dental handpiece system according to a modified embodiment of the present disclosure, and FIG. 7 is a plan view of an impeller in a handpiece in a dental handpiece system according to a modified embodiment of the present disclosure.

As shown, in a dental handpiece system according to a modified embodiment of the present disclosure, a handpiece is formed to include the head casing 110 having the chamber 110a therein, the impeller 120 that is installed rotatably inside the head casing 110 and has a plurality of blades 121 on its outer circumferential surface, and a burr 130 which is coupled to the impeller 120 and rotates. In the head casing 110, a first nozzle 115a and a second nozzle 115b that are independent from each other are separately formed as a nozzle for injecting driving air supplied from the air pump 161 toward the blades 121 of the impeller 120, and thus the handpiece is configured to simultaneously inject air to the plurality of adjacent blades 121 while the air is supplied from the air pump 161 through flow paths independent from each other.

The handpiece may increase the rotational force for the impeller 120 of the same size by a unique dual structure in which the driving air is injected to two blades 121 by the two different nozzles, and thus it is possible to implement a dental handpiece having a smaller size compared to the same output.

To this end, the head casing 110 includes the chamber 110a in which the impeller 120 is rotatably installed. The head casing 110 has the dual structure in a rear body portion, and in the dual structure, the first nozzle 115a and the second nozzle 115b that are independent from each other are separately formed as the nozzle for injecting the driving air supplied from the air pump 161 toward the blades 121 of the impeller 120, as described above. The first nozzle 115a and the second nozzle 115b are supplied with air from the air pump 161 through independent flow paths and simultaneously inject the air to the different blades 121, thereby capable of increasing the rotational force of the impeller 120.

Here, it is preferable that the blades 121 of the impeller 120 to which the first nozzle 115a and the second nozzle 115b inject the driving air are adjacent to each other. Then, two propulsion forces generated by the air injected from the first nozzle 115a and the second nozzle 115b are formed in similar directions to each other without being dispersed, thereby increasing efficiency. Accordingly, the angle between the first nozzle 115a and the second nozzle 115b is formed to coincide with the angle between air contact surfaces 121a of the blades 121 adjacent to each other in the impeller 120. Specifically, as shown in FIG. 6, the first nozzle 115a is formed toward the front from one side (left side in the drawing) of the left and right sides of the head casing 110, and the second nozzle 115b is formed in an oblique direction from the other side of the head casing 110 to the vicinity of a tip of the first nozzle 115a. The second nozzle 115b is formed in a shape to reach the vicinity of the tip of the first nozzle 115a in a straight line through the other side surface of the head casing 110 for convenience of manufacture, and a resulting through-hole on the other side surface is filled by a cap 116.

When the first nozzle 115a and the second nozzle 115b formed independently and separately in the head casing 110 as described above inject the driving air, two propulsion forces F1 and F2 act simultaneously by air in contact with the air contact surfaces 121a of the two different blades 121 as shown in FIG. 7, so that it is possible to dramatically improve the rotational force of the impeller 120.

A first supply port 111a communicating with the first nozzle 115a and a second supply port 111b communicating with the second nozzle 115b are formed in the head casing 110, and the first supply port 111a is formed to extend in a straight line from the first nozzle 115a and the second supply port 111b is formed to intersect with the second nozzle 115b in an oblique direction. These first supply port 111a and second supply port 111b are independently connected to the air pump 161 by the first air supply pipe 141a and the second air supply pipe 141b, respectively. An important point in this configuration is that the flow paths from the air pump 161 to the first nozzle 115a and the second nozzle 115b are independently formed from beginning to end. This is because if the two flow paths are initially integrated into one and have a branching structure in the middle, the cross-sectional area of the flow paths is narrowed at the point where they are integrated into one, and frictional loss occurs, resulting in a significant loss of propulsion force for the impeller 120.

In addition, as shown in FIG. 5, a first discharge port 112a mainly responsible for discharging the air injected into the head casing 110 from the first nozzle 115a is formed near the first nozzle 115a in the head casing 110, and is formed to have a wider inner diameter than the first nozzle 115a.

Similarly, a second discharge port 112b mainly responsible for discharging the air injected into the head casing 110 from the second nozzle 115b separately from the first nozzle 115a is formed near the second nozzle 115b, and is formed to have a wider inner diameter than the second nozzle 115b. As a result, external discharge of the air injected into the head casing 110 may be smoothly performed.

In addition, as shown in FIG. 5, in the head casing 110, a cooling water supply port 113 for supplying cooling water to the inside of the head casing 110 and an air supply port for cooling water 114 for supplying air used to inject the cooling water are formed. The cooling water supply port 113 is connected to the cooling water supply pipe 144, and the air supply port for cooling water 114 is connected to the air supply pipe for cooling water 145.

Next, a result of an experiment conducted to identify performance of a dual nozzle type handpiece having the above configuration will be described below.

This experiment was conducted by comparing the present applicant's conventional product which had only one nozzle and products of Germany's KAYO and Japan's NSK with the dual nozzle type handpiece according to the present disclosure, respectively, to compare the rotational force of the impeller 120 (stop torque value ($g_{fo}$ cm)). As a result of the experiment, as can be seen in Table 2 below, improvements of 33 to 40% compared to the applicant's conventional product, 10 to 30% compared to the KAYO (Germany) product, 10 to 27% compared to the NSK (Japan) product were confirmed by the present disclosure in a normal working pressure range of

TABLE 2

| | Driving air pressure (Mpa) | | | | | | | | |
|---|---|---|---|---|---|---|---|---|---|
| | 0.25 | 0.3 | 0.35 | 0.4 | 0.45 | 0.5 | 0.55 | 0.6 | 0.65 |
| KAVO | 7 | 8 | 10 | 11.5 | 14 | 15 | 17 | 20 | 22 |
| NSK | 7.5 | 9 | 10 | 11 | 13 | 15 | 16 | 17 | 19 |
| Conventional product | 6 | 8 | 9 | 10 | 13 | 12.5 | 15 | 17 | 18 |
| Embodiment | 9 | 10 | 11 | 14 | 14 | 15 | 17 | 19 | 22 |

Figure 8:
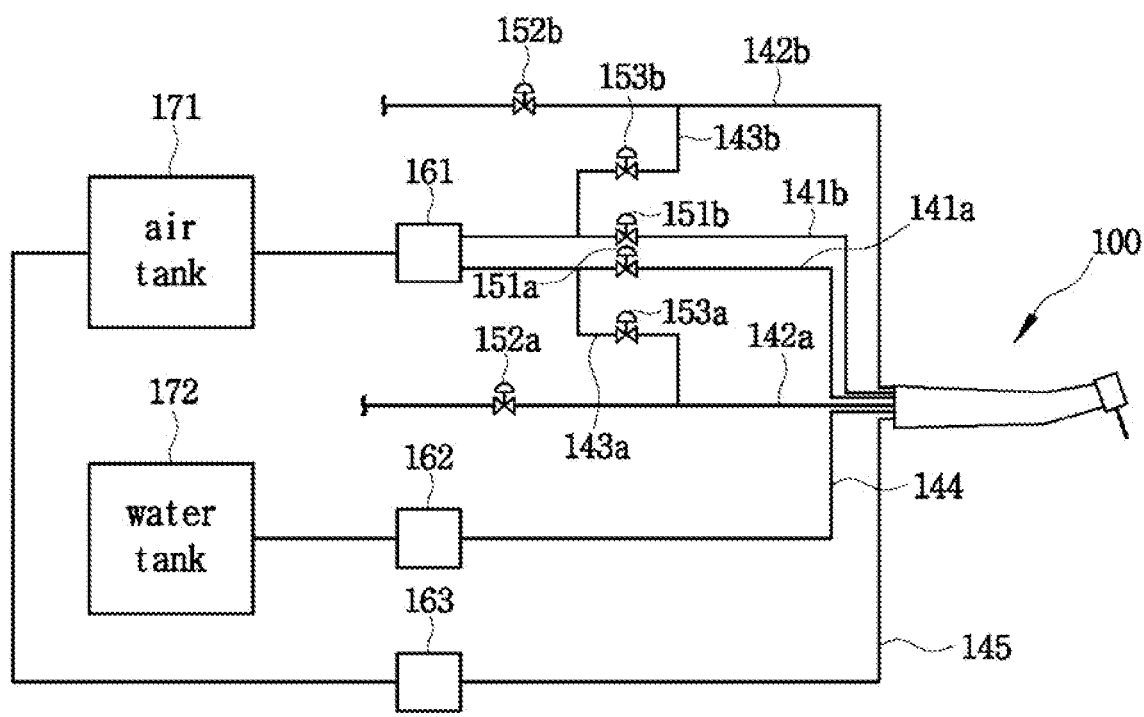
FIG. 8 is an overall configuration diagram for explaining a suckback prevention structure of a dental handpiece system according to a modified embodiment of the present disclosure by use of a dual nozzle type handpiece.

As such, when the dual nozzle type handpiece is used in the dental handpiece system according to the embodiment of the present disclosure, a structure for preventing suckback should also be modified accordingly. It will be described below. FIG. 8 is an overall configuration diagram for explaining a suckback prevention structure of a dental handpiece system according to a modified embodiment of the present disclosure by use of a dual nozzle type handpiece.

As shown, a dental handpiece system according to a modified embodiment of the present disclosure includes, due to use of the dual nozzle type handpiece, the first air supply pipe 141a connected to the first nozzle 115a to supply the driving air from the air pump 161, the second air supply pipe 141b connected to the second nozzle 115b separately from the first air supply pipe 141a to supply the driving air from the air pump 161, a first air discharge pipe 142a connected to the first discharge port 112a to discharge the air inside the head casing 110 to the outside, and a second air discharge pipe 142b connected to the second discharge port 112b to discharge the air inside the head casing 110 to the outside.

In addition, a first bypass pipe 143a connecting the first air supply pipe 141a and the first air discharge pipe 142a while bypassing the head casing 110 is further included. At the moment the impeller 120 stops rotating and halts, the first bypass pipe 143a serves to guide the air pumped from the air pump 161 to be injected into the head casing 110 through the first air discharge pipe 142a instead of the first air supply pipe 141a. In addition, a second bypass pipe 143b connecting the first air supply pipe 141a and the second air discharge pipe 142b while bypassing the head casing 110 is further included. At the moment the impeller 120 stops rotating and halts, the second bypass pipe 143b serves to guide the air pumped from the air pump 161 to be injected into the head casing 110 through the second air discharge pipe 142b instead of the second air supply pipe 141b.

Further, a first solenoid valve 151a is installed in the first air supply pipe 141a, a second solenoid valve 152a is installed in the first air discharge pipe 142a, a third solenoid valve 153a is installed in the first bypass pipe 143a, a fourth solenoid valve 151b is installed in the second air supply pipe 142b, a fifth solenoid valve 152b is installed in the second air discharge pipe 142b, and a sixth solenoid valve 153b is installed in the second bypass pipe 143b, respectively.

Here, it should be noted that the first solenoid valve 151a is installed upstream of a connection point of the first bypass pipe 143a in the first air supply pipe 141a, the second solenoid valve 152a is installed downstream of a connection point of the first bypass pipe 143a in the first air discharge pipe 142a, the fourth solenoid valve 151b is installed upstream of a connection point of the second bypass pipe 143b in the second air supply pipe 141b, and the fifth solenoid valve 152b is installed downstream of a connection point of the second bypass pipe 143b in the second air discharge pipe 142b.

According to this configuration, at the moment the impeller 120 stops rotating and halts, the first solenoid valve 151a, the second solenoid valve 152a, the fourth solenoid valve 151b, and the fifth solenoid valve 152b are in closed states to block flow paths, and the third solenoid valve 153a and the sixth solenoid valve 153b are in open states to guide the air pumped by the air pump 161 to be injected into the head casing 110 through the first air discharge pipe 142a and the second air discharge pipe 142b, and thereby, it is possible to reliably prevent the suckback phenomenon, which has been a chronic problem.

The open and closed states of the solenoid valves according to the driving states of the impeller 120 of the handpiece are summarized as follows, and in particular, the open or closed state of each solenoid valve for preventing the suckback phenomenon at the moment the impeller 120 halts should be noted.

TABLE 3

| Operation order | Driving state | First solenoid valve 151a / Fourth solenoid valve 151b | Second solenoid valve 152a / Fifth solenoid valve 152b | Third solenoid valve 153a / Sixth solenoid valve 153b |
| --- | --- | --- | --- | --- |
| Stage 1 | Ready to drive | X | O | X |
| Stage 2 | Running | O | O | X |
| Stage 3 | Moment of halt | X | X | O |
| Stage 4 | End of drive | X | O | X |

The dental handpiece system according to the modified embodiment of the present disclosure employs the dual nozzle type handpiece as described above to have a composite advantage of significantly improving the rotational force of the impeller 120 and completely blocking the suckback phenomenon which has been the chronic problem that has occurred at the moment the impeller 120 halts.

Although preferred embodiments of the present disclosure have been described above, various changes, modifications and equivalents may be used in the present disclosure. It is clear that the present disclosure may be equally applied by appropriately modifying the above embodiments. Accordingly, the above description is not intended to limit the scope of the present disclosure, which is defined by the limits of the appended claims.

The invention claimed is:
1. A dental handpiece system for preventing suckback, comprising:
 a head casing;
 a first air supply pipe and a second air supply pipe configured to independently supply driving air pumped from an air pump, and respectively connected to a first nozzle and a second nozzle installed in the head casing;
 the first nozzle and the second nozzle being separately formed and configured to simultaneously inject the driving air from the air pump to adjacent blades of an impeller installed in the head casing, via independent flow paths, to increase a rotational force of the impeller;
 a first air discharge pipe connected to a first discharge port that discharges air injected from the first nozzle to an outside of the head casing;
 a second air discharge pipe connected to a second discharge port that discharges air injected from the second nozzle to the outside of the head casing;
 a first bypass pipe connecting the first air supply pipe and the first air discharge pipe while bypassing the head casing;
 a second bypass pipe connecting the first air supply pipe and the second air discharge pipe while bypassing the head casing;
 a first solenoid valve installed in the first air supply pipe upstream of a connection point of the first bypass pipe;
 a second solenoid valve installed in the first air discharge downstream of the connection point of the first bypass pipe;
 a third solenoid valve installed in the first bypass pipe;
 a fourth solenoid valve installed in the second air supply pipe upstream of a connection point of the second bypass pipe;
 a fifth solenoid valve installed in the second air discharge pipe downstream of the connection point of the second bypass pipe;
 a sixth solenoid valve installed in the second bypass pipe,
 wherein at the moment the impeller stops rotating and halts, the first solenoid valve, the second solenoid valve, the fourth solenoid valve, and the fifth solenoid valve are closed to block flow paths, and the third solenoid valve and the sixth solenoid valve are open to guide the air pumped from the air pump to be injected into the head casing through the first air discharge pipe and the second air discharge pipe, respectively, thereby reliably preventing a suckback phenomenon.

* * * * *